(12) United States Patent
Hayashi

(10) Patent No.: US 9,012,806 B2
(45) Date of Patent: Apr. 21, 2015

(54) PULSE LASER PROCESSING DEVICE

(75) Inventor: Makoto Hayashi, Kanagawa (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 978 days.

(21) Appl. No.: 13/139,480

(22) PCT Filed: Nov. 6, 2009

(86) PCT No.: PCT/JP2009/005893
§ 371 (c)(1),
(2), (4) Date: Jun. 13, 2011

(87) PCT Pub. No.: WO2010/073465
PCT Pub. Date: Jul. 1, 2010

(65) Prior Publication Data
US 2011/0240619 A1 Oct. 6, 2011

(30) Foreign Application Priority Data

Dec. 24, 2008 (JP) .................................. 2008-328491
Oct. 14, 2009 (JP) .................................. 2009-236889

(51) Int. Cl.
*B23K 26/08* (2014.01)
*B23K 26/06* (2014.01)

(52) U.S. Cl.
CPC ........... *B23K 26/083* (2013.01); *B23K 26/0626* (2013.01); *B23K 26/063* (2013.01); *B23K 26/0869* (2013.01)

(58) Field of Classification Search
CPC ............ B23K 26/032; B23K 26/0853; B23K 26/0626; B23K 26/063; B23K 26/083; B23K 26/0869
USPC ............. 219/121.61, 121.62, 121.78, 121.79, 219/121.8, 121.81, 121.82; 359/197.1, 359/201.2
See application file for complete search history.

(56) References Cited

U.S. PATENT DOCUMENTS 5,191,187 A * 3/1993 Kajikawa ................. 219/121.76
5,751,585 A * 5/1998 Cutler et al. .................. 700/161
(Continued)

FOREIGN PATENT DOCUMENTS

EP 0 462 842 12/1991
JP 2002-090682 3/2002
(Continued)

OTHER PUBLICATIONS

Machine translation of Japan Patent document No. 2002-090,682, Jun. 2014.*
(Continued)

*Primary Examiner* — Geoffrey S Evans
(74) *Attorney, Agent, or Firm* — DLA Piper LLP (US)

(57) ABSTRACT

Provide a pulse laser processing device which facilitates stable microfabrication of the surface of a large target processing material, and an increase in the speed of microfabrication. The pulse laser processing device includes a reference clock oscillating circuit which generates a clock signal, a laser oscillator which emits a pulse laser beam synchronized with the clock signal, a laser scanner which scans a pulse laser beam only in a one-dimensional direction in synchronization with the clock signal, a stage on which the target processing material can be placed and which moves in a direction orthogonal to the one-dimensional direction, and a pulse picker which is provided on an optical path between the laser oscillator and laser scanner and which switches pass and block of the pulse laser beam in synchronization with the clock signal.

6 Claims, 9 Drawing Sheets

(56) References Cited

U.S. PATENT DOCUMENTS

| | | | |
|---|---|---|---|
| 6,007,929 A * | 12/1999 | Robertson et al. | 427/554 |
| 6,172,325 B1 * | 1/2001 | Baird et al. | 219/121.62 |
| 6,706,999 B1 * | 3/2004 | Barrett et al. | 219/121.74 |
| 8,426,768 B2 * | 4/2013 | Rekowski | 219/121.81 |
| 2005/0100062 A1 * | 5/2005 | Grant et al. | 219/121.6 |
| 2006/0191884 A1 * | 8/2006 | Johnson et al. | 219/121.85 |
| 2008/0029491 A1 * | 2/2008 | Johnson et al. | 219/121.6 |
| 2008/0030876 A1 | 2/2008 | Katoaka | |
| 2008/0035618 A1 * | 2/2008 | Bruland | 219/121.76 |
| 2009/0206066 A1 * | 8/2009 | Rekowski | 219/121.81 |
| 2009/0242528 A1 * | 10/2009 | Howerton et al. | 219/121.71 |
| 2009/0242531 A1 * | 10/2009 | Baird et al. | 219/121.81 |
| 2012/0187103 A1 * | 7/2012 | Hayashi | 219/383 |

FOREIGN PATENT DOCUMENTS

| | | | |
|---|---|---|---|
| JP | 2002-090682 A * | 3/2002 | |
| JP | 2002-160086 | 6/2002 | |
| JP | 2000-321528 | 11/2002 | |
| JP | 2003-080386 | 3/2003 | |
| JP | 2004-230438 | 8/2004 | |
| JP | 2005-118821 | 5/2005 | |
| JP | 2007-507358 | 3/2007 | |
| JP | 2008-060139 | 3/2008 | |
| JP | 2008-060139 A * | 3/2008 | |
| JP | 2008-254029 | 10/2008 | |
| WO | WO 2005/032757 | 4/2005 | |
| WO | WO 2008/053915 | 5/2008 | |

OTHER PUBLICATIONS

Machine translation of Japan Patent document No. 2008-060,139, Jun. 2014.*
English Language Abstract of JP 2005-118821 published May 12, 2005.
English Language Translation of JP 2005-118821 published May 12, 2005.
English Language Abstract of JP 2002-160086 published Jun. 4, 2002.
English Language Translation of JP 2002-160086 published Jun. 4, 2002.
International Search Report issued in PCT/JP2009/005893 mailed on Feb. 16, 2010.
English Language Abstract of JP 2008-254029 published Oct. 23, 2008.
English Language Translation of JP 2008-254029 published Oct. 23, 2008.
English Language Abstract of JP 2008-060139 published Mar. 13, 2008.
English Language Translation of JP 2008-060139 published Mar. 13, 2008.
English Language Abstract of JP 2004-230438 published Aug. 19, 2004.
English Language Translation of JP 2004-230438 published Aug. 19, 2004.
English Language Abstract of JP 2000-321528 published Nov. 24, 2000.
English Language Translation of JP 2000-321528 published Nov. 24, 2000.
English Language Abstract of JP 2002-090682 published Mar. 27, 2002.
English Language Translation of JP 2002-090682 published Mar. 27, 2002.
Japanese Office Action issued in JP 2009-236889 on May 11, 2011.
English Language Translation of Japanese Office Action issued in JP 2009-236889 on May 11, 2011.
English Language Abstract of JP 2003-080386 published on Mar. 18, 2003.
English Language Translation of JP 2003-080386 published on Mar. 18, 2003.
Enslish Language Abstract of JP 2007-507358 published on Mar. 29, 2007.
English Language Translation of JP 2007-507358 published on Mar. 29, 2007.
English Language Abstract of WO 2008/053915 published May 8, 2008.
German Office Action issued in 11 2009 003 829.8 on Nov. 29, 2012.
English Language Translation of German Office Action issued in 11 2009 003 829.8 on Nov. 29, 2012.
Japanese Office Action issued in JP 2010-155524 mailed on Feb. 14, 2012.
English Language Translation Japanese Office Action issued in JP 2010-155524 mailed on Feb. 14, 2012.

* cited by examiner

PULSE LASER PROCESSING DEVICE

TECHNICAL FIELD

The present invention relates to a laser processing device which uses laser beams, more particularly, the present invention relates to a pulse laser processing device which facilitates microfabrication of the surface of a target processing material which is made larger by pulse laser beams, and an increase in the speed of microfabrication.

BACKGROUND ART

Recently, a flat panel display (FPD) such as a liquid crystal panel is made larger and therefore requires members in which a large area is precisely microfabricated at the μm order or less. Further, microfabrication of molds and difficult-to-cut materials having a minute shape such as sheet making large roll molds, stop grooves or deep microlenses which are difficult to make with conventional mechanical processing is variously studied.

Further, it is known that, according to ablation processing using an ultrashort pulse laser having the pulse width equal to or less than a pico second (ps) order, it is possible to easily form a minute pattern equal to or less than 1 μm on, for example, a metal surface. Furthermore, various methods have been proposed for a technique which, with this ultrashort pulse laser processing, processes the surface of a target processing material made of a polymer material including resin, semiconductor material, glass material or metal member (see, for example, Patent Literature 1).

Here, when a large area is microfabricated by laser processing disclosed in Patent Literature 1, a target processing material held on a stage needs to be moved and scanned in a wide range in the two-dimensional direction of the X-Y direction. However, the speed of microfabrication in this case is controlled to the speed to movement of the stage, and therefore it is difficult to increase the speed. In addition, to establish synchronization with this slow stage movement, high speed shuttering is applied to a pulse laser beam (hereinafter, also "pulse light") emitted from a laser oscillator, and a pulse frequency (hereinafter, also "repetition frequency") is modulated low.

Further, a technique is known in laser processing which microfabricates a predetermined area by two-dimensionally scanning a laser beam in the X-Y direction by means of, for example, a beam scanning unit such as a galvanometer scanner (see, for example, "Patent Literature 2"). However, with the recent technique, two-dimensional scan of pulse light in this case requires positioning precision equal to or more than 10 μm for irradiation spots, and therefore is difficult to apply microfabrication by ablation using pulse laser beams.

CITATION LIST

Patent Literature

Patent Literature 1: Japanese Patent Application Laid-Open No. 2005-118821
Patent Literature 2: Japanese Patent Application Laid-Open No. 2002-160086

SUMMARY OF INVENTION

Technical Problem

The present invention has been made in view of the above problem, and it is therefore an object of the present invention to provide a pulse laser processing device which, in processing using pulse laser beams, can improve positioning precision for irradiation spots and can perform stable microfabrication of a surface of a large target processing material and increase the speed of microfabrication.

Solution to Problem

The pulse laser processing apparatus according to one aspect of the present invention includes: a reference clock oscillating circuit which generates a clock signal; a laser oscillator which emits a pulse laser beam synchronized with the clock signal; a laser scanner which scans the pulse laser beam only in a one-dimensional direction in synchronization with the clock signal; a stage on which a target processing material can be placed and which moves in a direction orthogonal to the one-dimensional direction; and a pulse picker which is provided on an optical path between the laser oscillator and the laser scanner and which switches between pass and block of the pulse laser beam in synchronization with the clock signal.

It is preferable in the above aspect that the pulse laser processing device have a correcting mechanism which corrects a processing original point position of each scan, based on a scan position signal from the laser scanner.

It is preferable in the above aspect that the correcting mechanism control pass and block of the pulse laser beam in the pulse picker based on the scan position signal.

It is preferable in the above aspect that movement of the stage be controlled in a direction orthogonal to the one-dimensional direction based on a scan position signal of the laser scanner.

It is preferable in the above aspect that the pulse laser processing device have a beam shaping device which shapes the pulse laser beam, on an optical path between the laser oscillator and the laser scanner.

It is preferable in the above aspect that the target processing material be processed by alternately repeating scanning the pulse laser beam in the one-dimensional direction by means of the laser beam scanner and moving a stage in a direction orthogonal to the one-dimensional direction after the scan.

It is preferable in the above aspect that a single portion of a surface of the target processing material be processed a plurality of times by performing the scan by the laser scanner and moving the stage.

It is preferable in the above aspect that a surface of the target processing material be processed by ablation using the pulse laser beam.

It is preferable in the above aspect that the laser scanner have a galvanometer scanner; and that the pulse picker have an acousto-optic modulator (AOM) or an electro-optic modulator (EOM).

Further, the pulse laser processing method according to an aspect of the present invention includes: placing a target processing material on a stage; generating a clock signal; emitting a pulse laser beam synchronized with the clock signal; scanning the pulse laser beam in a one-dimensional direction by switching pass and block of the pulse laser beam in synchronization with the clock signal on the target processing material; moving the stage in a direction orthogonal to the one-dimensional direction after scanning the pulse laser beam in the one-dimensional direction; and scanning the pulse laser beam in the one-dimensional direction by switching pass and block in synchronization with the clock signal.

Advantageous Effects of Invention

According to the present invention, in processing using a pulse laser beam, it is possible to improve positioning precision for irradiation spots, and perform stable microfabrication of a surface of a large target processing material and increase the speed of microfabrication.

DESCRIPTION OF EMBODIMENT

Hereinafter, an embodiment of the present invention will be described with reference to the drawings.

The pulse laser processing device according to the present embodiment has a reference clock oscillating circuit which generates a clock signal, a laser oscillator which emits a pulse laser beam synchronized with the clock signal, a laser scanner which scans the pulse laser beam only in a one-dimensional direction in synchronization with the clock signal, a stage on which a target processing material can be placed and which moves the target processing material in a direction orthogonal to the one-dimensional direction, and a pulse picker which is provided on an optical path between the laser oscillator and laser scanner and which switches between pass and block of a pulse laser beam in synchronization with the clock signal.

According to the above configuration, it is possible to emit a pulse laser beam, scan the pulse laser beam and control pass and block of the pulse laser beam in synchronization with a single clock signal. That is, the laser system and scanning system in the pulse laser processing device can be synchronized easily and precisely. Further, by using a laser scanner for the scanning system, it is possible to increase the processing speed. Hence, a pulse laser processing device is realized which, in processing using pulse laser beams, improves positioning precision for irradiation spots of the pulse laser beams, and can perform stable microfabrication of the surface of a large target processing material and increase the speed of microfabrication.

Figure 1:
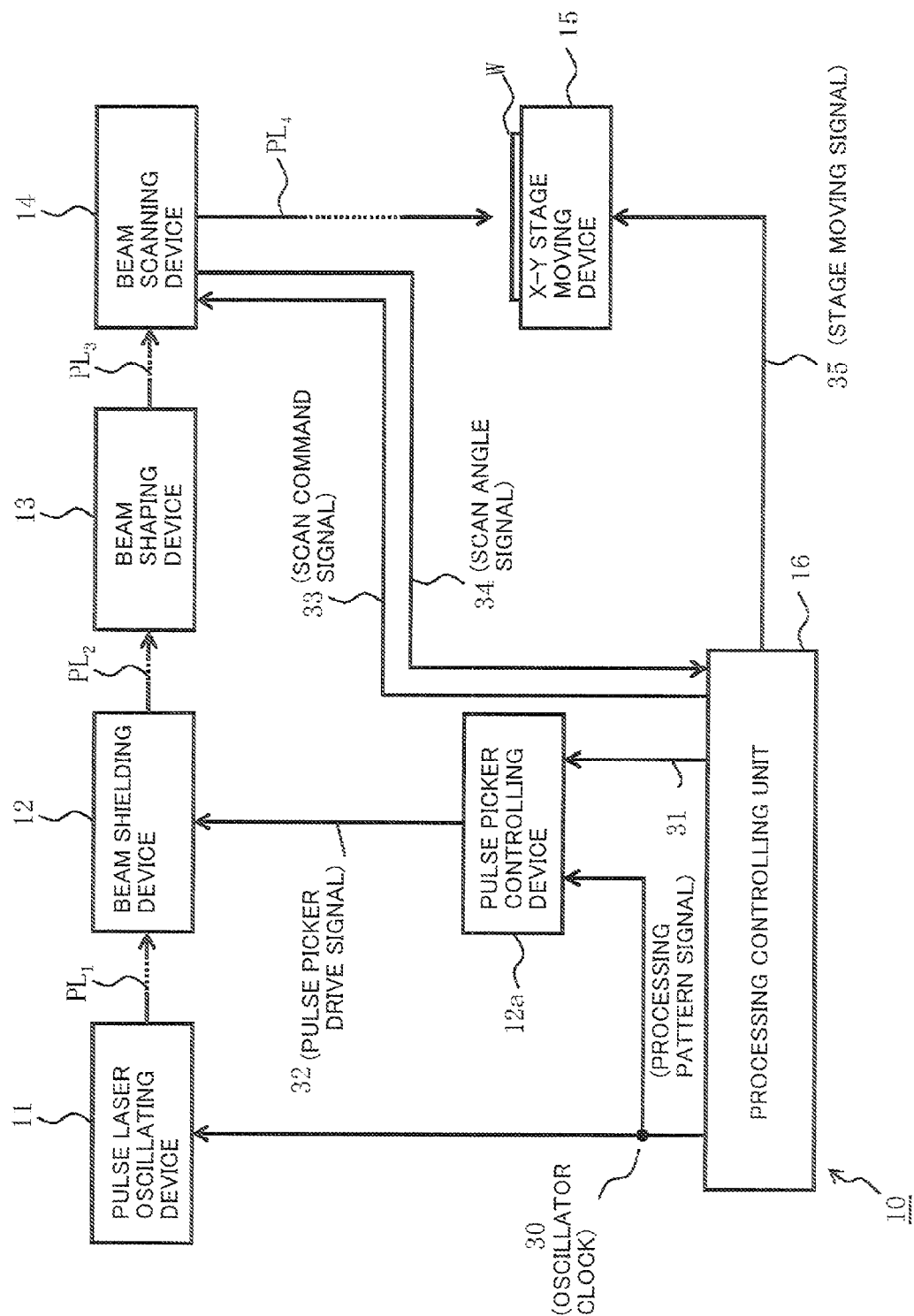
FIG. 1 is a schematic configuration diagram illustrating an example of a pulse laser processing device according to an embodiment of the present invention.

FIG. 1 is a schematic configuration diagram illustrating an example of a pulse laser processing device. As shown in FIG. 1, a pulse laser processing device 10 according to the present embodiment employs a configuration mainly including a pulse laser oscillating device 11 which is a laser oscillator, a beam shielding device 12, a beam shaping device 13, a beam scanning device (laser scanner) 14, an X-Y stage moving device 15 and a processing controlling unit 16. Here, for example, a workpiece W of a large metal plate which is a target processing material is placed on the X-Y stage moving device 15.

Further, the pulse laser processing device 10 has a reference clock oscillating circuit (not illustrated) which produces a clock signal. This reference clock oscillating circuit is provided in, for example, the processing controlling unit 16.

The pulse laser oscillating device 11 preferably oscillates a ps laser beam of the ultrashort pulse or a femto second (fs) laser beam. Here, the laser wavelength is selected taking the optical absorptance and optical reflectivity of a target processing material into account. In case of a target processing material made of a metal material including Cu, Ni and SKD11 which is a difficult-to-cut material or diamond like carbon (DLC), the second harmonic of Nd:YAG laser (wavelength: 532 nm) is substantially suitable.

With this YAG laser, pulse light of a predetermined pulse frequency is generated from a YAG rod which is an active medium by means of a so-called Q switch. Further, pulse light having the fundamental wave of 1064 nm passes through a wavelength converting crystal such as $KTiOPO_4$ (KTP), $LiB_3O_5$ (LBO) and BBO ($\beta$-$BaB_2O_4$), and is converted into the second harmonic of P polarized light. Further, the pulse frequency is set to, for example, about 50 kHz to 500 kHz.

In the above YAG laser oscillator, Nd:YLF crystal, $Nd:YVO_4$ crystal and Yb:YAG crystal as well as Nd:YAG laser can be used for an active medium which generates a fundamental wave. Further, a YAG laser oscillator using the third harmonic of the fundamental wave (wavelength: 355 nm) may be used. Meanwhile, in this case, to reduce absorption and attenuation of laser beams in air, it is necessary to reduce the pressure of the optical path.

The beam shielding device 12 is provided on the optical path between the pulse laser oscillating device 11 and beam scanning device 14. The beam shielding device 12 has a so-called pulse picker. Further, by blocking or passing a pulse laser beam emitted at a constant frequency from the pulse laser oscillating device 11 by means of a pulse picker drive signal synchronized with a clock signal generated in the reference clock oscillating circuit, a predetermined pulse laser beam is extracted. By this means, the pulse frequency of the pulse laser beam is modulated although the details will be described below.

Figure 2:
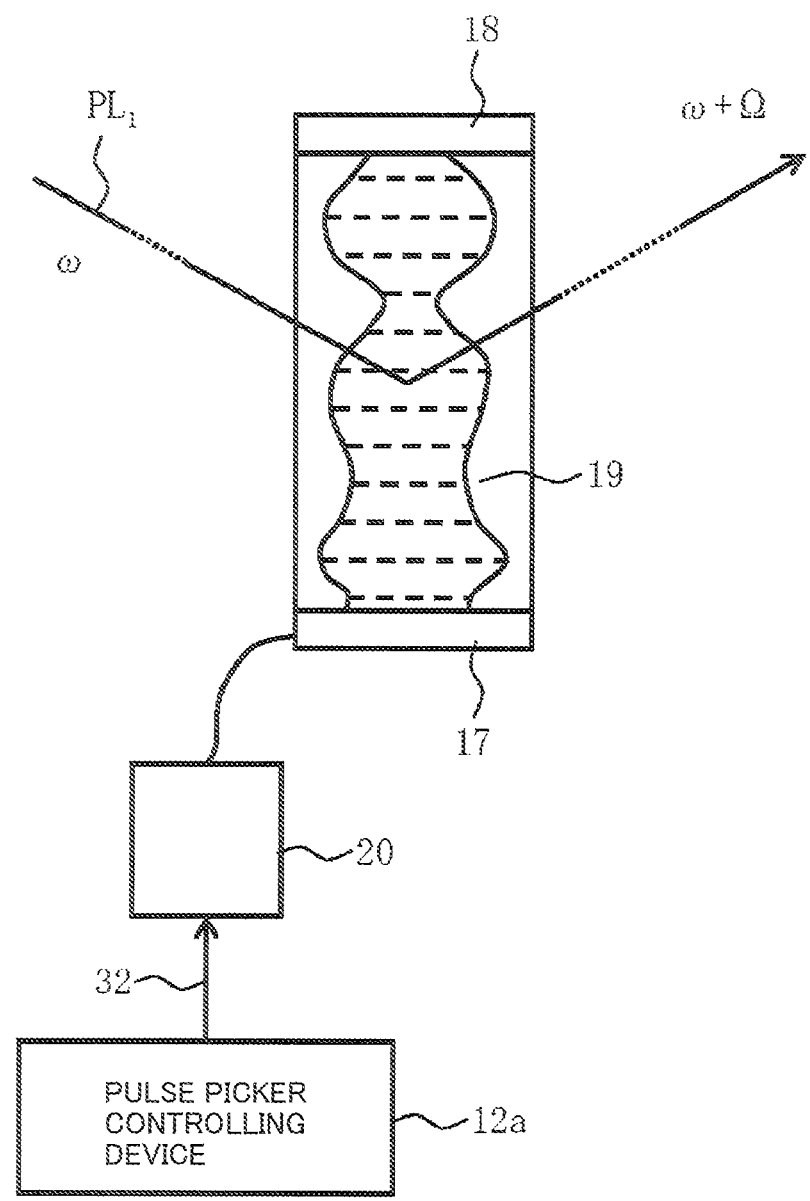
FIG. 2 is an explanatory diagram illustrating an example of a beam shielding device used in the pulse laser processing device according to the embodiment of the present invention.

For high speed shuttering of a pulse laser beam in this beam shielding device 12, an acousto-optic modulator (AOM) described in FIG. 2 will be suitably used. For example, an ultrasonic wave 19 is generated between an ultrasonic wave oscillating unit 17 and a sound wave absorbing unit 18 which have, for example, a piezoelectric element and an acoustic element. Here, a pulse picker drive signal 32 is given from a pulse picker controlling device 12a to an ultrasonic wave generation controlling unit 20. Further, this ultrasonic wave generation controlling unit 20 controls on/off of ultrasonic wave oscillation, and gives a predetermined pulse voltage which drives the above piezoelectric element, to the ultrasonic wave oscillating unit 17.

This beam shielding device 12 applies phonon energy of the ultrasonic wave 19 in the on state of ultrasonic wave oscillation based on the above pulse picker drive signal 32 to a pulse laser beam $PL_1$ emitted from the pulse laser oscillating device 11, and the phonon frequency ($\omega$) increases to ($\omega+\Omega$), thereby converting the wavelength. Then, the pulse laser beam $PL_1$ is diffracted and scattered and shuttered in this on state. Thus, the pulse frequency of the pulse laser beam $PL_1$ is modulated and, as shown in FIG. 1, is converted into the pulse laser beam $PL_2$ and incident on the beam shaping device 13.

This beam shielding device 12 can additionally use a Raman diffraction electro-optic modulator (EOM) which passes or diffracts and scatters beams according to, for example, on/off of an electrical signal.

The beam shaping device 13 has a beam expander which expands the beam diameter of the incident pulse laser beam $PL_2$ at a certain magnification. This beam expander employs a configuration where, for example, common two optical lenses are arranged on a beam optical path. Here, the pulse laser beam $PL_2$ having passed this beam expander is collimated to parallel light.

Further, an optical element may be provided which makes the light intensity distribution of a beam cross section uniform, and makes the cross-sectional shape circular. This optical element can use, for example, two aspheric homogenizers. Plano-convex cylindricals are arranged on an optical path orthogonally to each other.

Further, an optical element may be provided which converts a beam into circular polarized light. For example, in case where the second harmonic of YAG laser is P polarized light of linear polarized light, P polarized light is converted into circular polarized light through, for example, a ¼ wavelength plate.

Further, an optical element or beam forming aperture which converts a light intensity distribution of the beam cross-section into a predetermined distribution such as a Gaussian distribution may be arranged on an optical path. The pulse laser beam $PL_3$ shaped in a predetermined shape by the above beam shaping device 13 is incident on the beam scanning device 14.

The beam scanning device 14 adopts a structure which one-dimensionally scans the pulse laser beam $PL_3$ only in the one-dimensional direction (X axis direction) at a constant speed. As the beam scanning device 14 which is suitable to perform one-dimensional beam scan, there is, for example, a galvanometer scanner having one axis scan mirror.

The basic configuration of the beam scanning device 14 including this galvanometer scanner will be described with reference to FIGS. 3 and 4. The galvanometer scanner has a one axis scan mirror 21 and a galvanometer 22 which scans the pulse laser beam $PL_3$ totally reflected following rotation vibration (oscillation) in the fixed deflection angle range of this scan mirror 21, at the angle indicated by the arrow in FIG. 3. Here, the galvanometer 22 has, for example, a driving mechanism such as a servo control motor which rotates the scan mirror by means of feedback from the scan angle sensor 24, and is driven and controlled according to a drive signal from the scanner controlling unit 23.

This beam scanning device 14 has the scan angle sensor 24, and, in case of the galvanometer scanner, adopts a structure which detects the rotation position of the one axis scan mirror 21 by means of a rotary encoder. Further, the scan angle sensor 24 outputs the detected scan angle detection signal to the scanner controlling unit 23 to use as the driving control signal for the galvanometer 22, and further transmits the scan angle detection signal to the processing controlling unit 16 as the scan angle signal 34.

Further, the pulse laser beam $PL_3$ reflected by the above one axis scan mirror 21 passes a f$\theta$ lens 25, and is converted into a pulse laser beam $PL_4$ having the image height H=f$\theta$ scanned in parallel in the one-dimensional direction at a constant scan speed V. Further, as described below, this pulse laser beam $PL_4$ is projected as irradiation pulse light which microfabricates the surface of the workpiece W held on the stage of the X-Y stage moving device 15.

In addition, for this beam scanning device 14, a polygon scanner having a polygon mirror, rotation controlling unit of the polygon mirror and f$\theta$ lens, a piezo scanner which rotates and vibrates the one axis scan mirror by means of the piezoelectric element, and a so-called resonant scanner can be variously used adequately.

With any one of the above laser scanners, it is important to perform control such that a constant scan speed V is secured between the start point and end point of the fixed deflection angle range of the scan mirror. That is, as shown in FIG. 4, in the scan field position of the pulse laser beam $PL_4$ on the surface of the workpiece W, an acceleration period in the position range corresponding to the scan start position to the scan end position in the scan angle range of the scan mirror, stable area and scan speed in the stable area in the deceleration period are controlled to be stable at virtually a V value.

The X-Y stage moving device 15 has a X-Y stage which is movable in the X-Y direction, a driving mechanism unit of the X-Y stage and a position sensor including a laser interferometer which measures the position of the X-Y stage. Here, the X-Y stage can continuously move or stepwisely move in a wide two-dimensional range, for example, the distance range of about 1 m in the X direction and Y direction. Further, the positioning precision and moving error are precisely configured within the submicron.

The processing controlling unit 16 has an integrated controlling unit which integrally controls control signals for devices such as the pulse laser oscillating device 11, beam shielding device 12, pulse picker controlling device 12a, beam scanning device 14, and X-Y stage scanning device 15. These devices (intra-device controlling units) and integrated controlling unit have micro computer (MCU), micro processor (MPU), digital signal processor (DSP) and semiconductor memory formed with a semiconductor integrated circuit, and can be built in one personal computer.

The above integrated controlling unit is configured to process data input from a terminal inputting unit of the processing controlling unit 16 (for example, a keyboard of a personal computer), and gives a command to each device (intra-device controlling unit). This input data includes a repetition frequency of a pulse laser beam, irradiation energy, shape and dimension of the pulse laser beam, pulse picker operation pattern, scanner moving speed, and moving pattern of the X-Y stage in the X-Y axis direction. Further, the integrated controlling unit gives commands of starting driving and stopping each device forming the pulse laser processing device 10. Further, the processing controlling unit 16 outputs various items of data through a terminal outputting unit.

The above pulse picker operation pattern and moving pattern of the X-Y stage in the X-Y axis direction are determined based on two-dimensional processed data of each processing layer obtained by expanding, to a three-dimensional bit map, volume information processed for the target processing material based on the setting of the three-dimensional processed shape, and irradiation energy, shape and dimension of the above pulse laser beam. Further, these patterns are determined as the absolute positions from the processing original point illustrated in FIG. 4.

The reference clock oscillating circuit of the processing controlling unit 16 generates an oscillator clock (clock signal) 30 given to the pulse laser oscillating device 11 based on repetition frequency input data of a pulse laser beam. Further, the pulse laser oscillating device 11 generates a pulse laser beam using the oscillator clock 30. That is, the pulse laser beam synchronized with the clock signal is emitted.

When a processing start command is issued, the pulse laser beam $PL_1$ is emitted by opening the built-in shutter. Thus, when the pulse laser beam $PL_1$ is emitted, the first pulse does not exist and stable output energy is maintained.

Further, the processing controlling unit 16 generates a processing pattern signal 31 from the above two-dimensional processed data. Further, the pulse picker controlling device 12a supplies to the beam shielding device 12 the pulse picker drive signal 32 which establishes synchronization with the pulse laser beam $PL_1$ by the oscillator clock 30, according to this processing pattern signal 31. Thus, the pulse picker switches between pass and block of the pulse laser beam in synchronization with the clock signal.

Further, the processing controlling unit 16 generates a scan command signal 33 which establishes synchronization with the oscillator clock 30 upon start of scan by the beam scanning device 14. Further, the scanner controlling unit 23 of the beam scanning device 14 performs driving control of the galvanometer 22 when receiving the above scan command signal 33. By so doing, the laser scanner scans the pulse laser beam only in the one-dimensional direction in synchronization with the clock signal.

Further, the processing controlling unit 16 decides a moving timing of the X-Y stage moving device 15 based on the scan angle signal 34 which is a scan position signal from the beam scanning device 14, and generates a stage moving signal 35 based on the above two-dimensional processed data and the above moving timing. The scan angle signal 34 in this case derives from a scan angle detection signal obtained by detecting in the scan angle sensor 24 a processing end position where processing described in FIG. 4 is finished or a scan end position where scanner scan is finished. Further, the X-Y stage moving device 15 operates in response to the command of the above stage moving signal 35.

In this way, movement of the X-Y stage is controlled in the direction orthogonal to the scan direction of the laser scanner based on the scan position signal of the laser scanner. By this means, the time to the next scan is reduced and the speed of laser beam processing is further increased.

Further, in the present embodiment, a correcting mechanism is preferably provided which corrects the processing original point position for each scan based on a scan position signal from the laser scanner. This is because, by providing this correcting mechanism, it is possible to compensate for variation in the scan speed in an acceleration period of the laser scanner (see FIG. 4) for each scan, and perform more precise processing.

In addition, a configuration may be employed in FIG. 1 where the processing controlling unit 16 also controls the beam shaping device 13. This is effective particularly when the beam shaping device 13 automatically controls the beam diameter or automatically adjusts a light intensity distribution of the beam cross-section.

Figure 5:
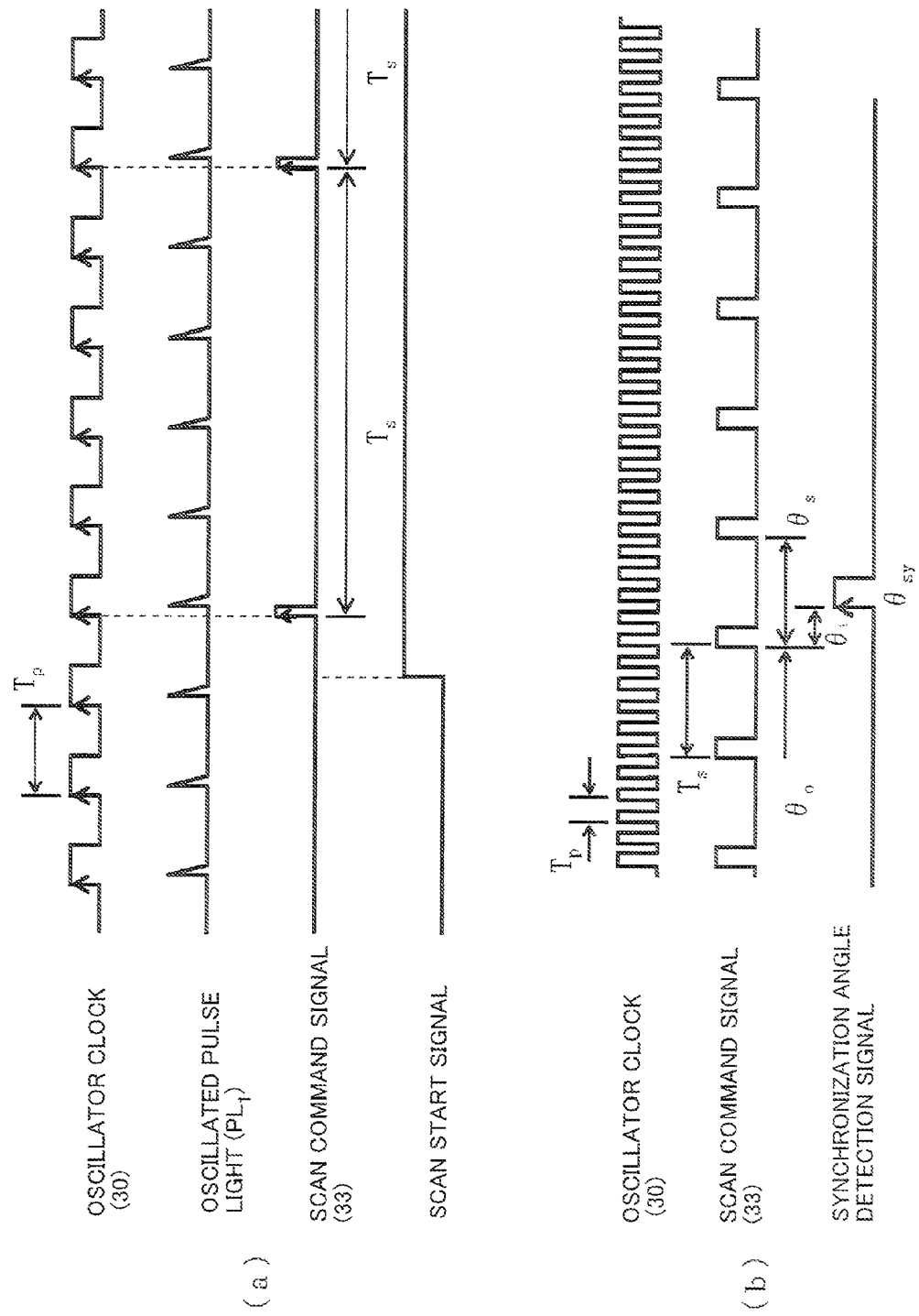
FIG. 5 is a signal waveform diagram for describing timing control in the pulse laser processing device according to the embodiment of the present invention.

Next, the main operation of the pulse laser processing device 10 will be described. In the laser processing operation of the workpiece W, the controlling unit built in the pulse laser oscillating device 11 controls most of laser oscillation and, consequently, the pulse laser oscillating device 11 independently operates. Meanwhile, the pulse oscillation timing is controlled according to the above oscillator clock 30. This will be described with reference to FIG. 5.

Figure 3:
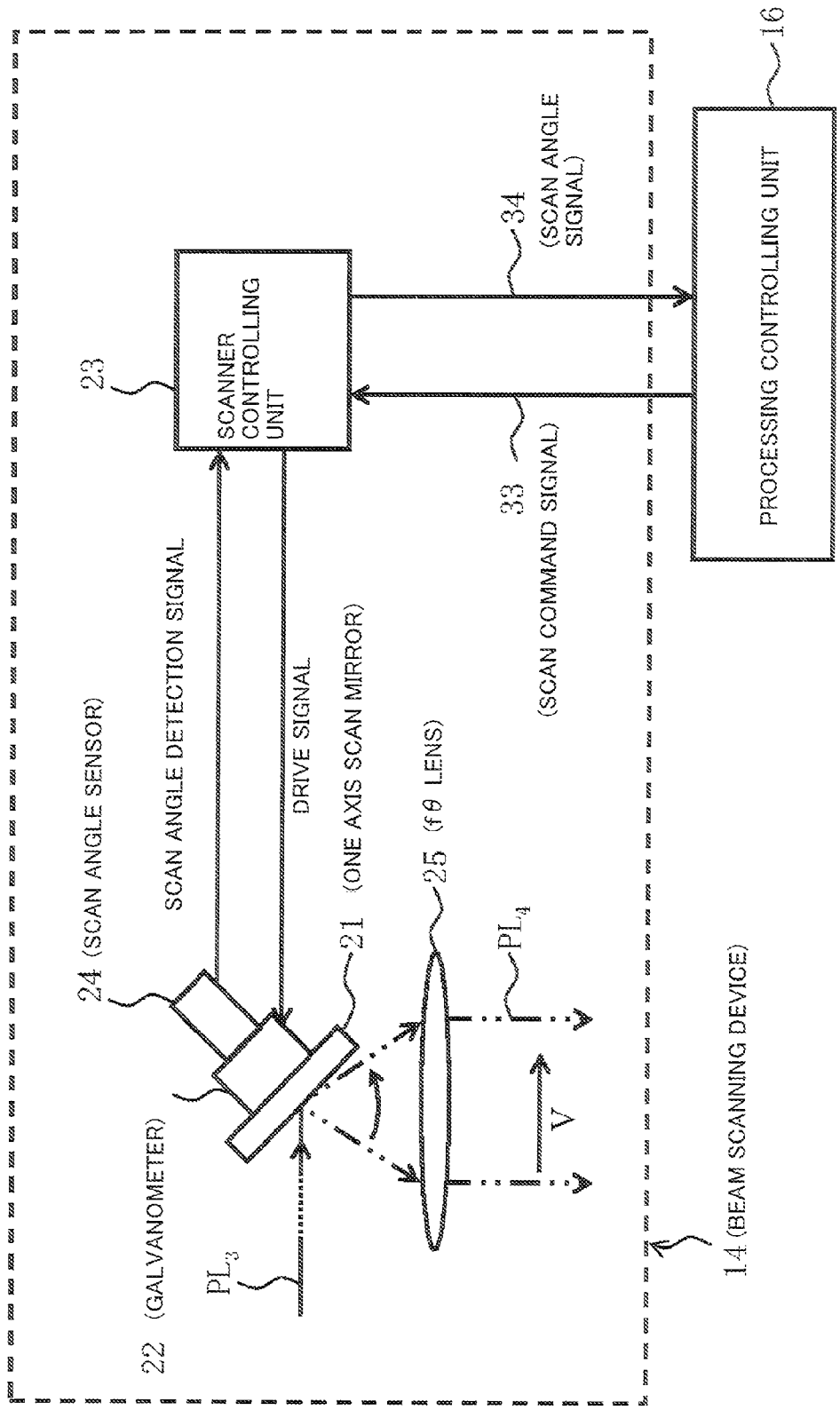
FIG. 3 is an explanatory diagram illustrating an example of a beam scanning device used in the pulse laser processing device according to the embodiment of the present invention.
Figure 4:
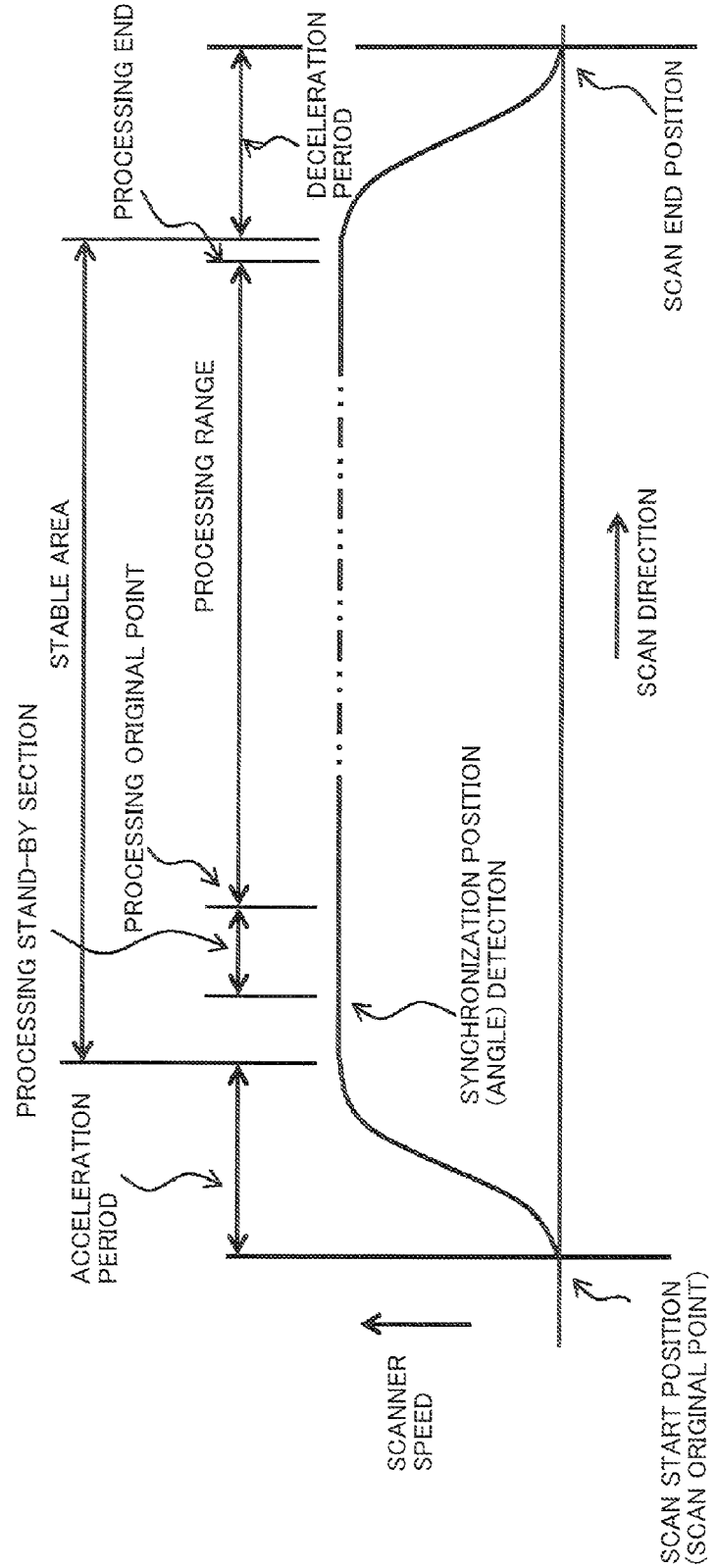
FIG. 4 is an explanatory diagram for describing scan by a beam scanning device used in the pulse laser processing device according to the embodiment of the present invention.

The one axis scan mirror 21 of the galvanometer which is illustrated in FIG. 3 as an example of a laser scanner starts scanning at the scan start position (scan original point) as described in FIG. 4 according to the scan start signal. At this time, as shown in FIG. 5(a), the beam scanning device 14 receives a command from the scan command signal 33 synchronized with, for example, a rise (fall is also possible) of the oscillator clock 30, and the scanner controlling unit 23 controls driving of the galvanometer 22. Here, the scan command signal 33 supports the XY2-100 protocol, and follows the absolute scan angle command at, for example, 100 kHz (Ts=10 μsec) without fail.

In addition, FIG. 5(a) illustrates an example of the scan command signal 33 synchronized with a rise of the oscillator clock 30 upon start of scan in case where the oscillation frequency of a pulse laser is 500 kHz (Tp=2 μsec), the beam diameter of the pulse laser beam is 16 μm and the scan speed V is 4000 mm/sec. This operation is performed every time the pulse laser beam is scanned.

Here, in the acceleration period in FIG. 4, the scanner controlling unit 23 controls driving of the galvanometer 22 according to the scan command signal 33 such that the scanner speed becomes the stable scan speed V earlier. At this time, it is empirically confirmed that about 10 μrad/p-p of the scan angle repetition reproducibility of the one axis scan mirror 21 under the optimal condition can be obtained in the stable area. This value is 1 μm/p-p of the scan position reproducibility in case where the fθ lens has 100 mm of the focal distance.

However, the repetition stability in the acceleration period deteriorates to about ten times in long scan, and therefore fluctuates per scan in the processing start position. Then, the correcting mechanism corrects the processing original point position per scan based on the scan position signal from the laser scanner.

For example, after the acceleration period is finished, when a sufficient stable area comes (for example, empirically, when the acceleration period is between 1 msec to 1.5 msec and the fθ lens has 100 mm of the focal distance, the scan angle range is between 2.3 degrees and 3.4 degrees) and the scan angle sensor 24 then detects a synchronization angle (θsy) set in advance in FIG. 5(b) as a detection signal, the difference from the scan command signal (θo: scan angle from the scan start position) is the phase difference (θi) and the distance to the processing original point for this scan command signal 33 is corrected according to this phase difference.

Assuming that the distance correction value up to the above processing original point is stored as the reference correction value for the first scan (i=1) upon processing, and the difference between the phase difference (θn) and phase difference (θ1) is a distance correction value up to the processing original point for the n-th scan with respect to the scan command signal of the first scan per scan from the n-th scan start position where i=n, and the processing original point positions upon first scan and upon n-th scan are matched.

Figure 6:
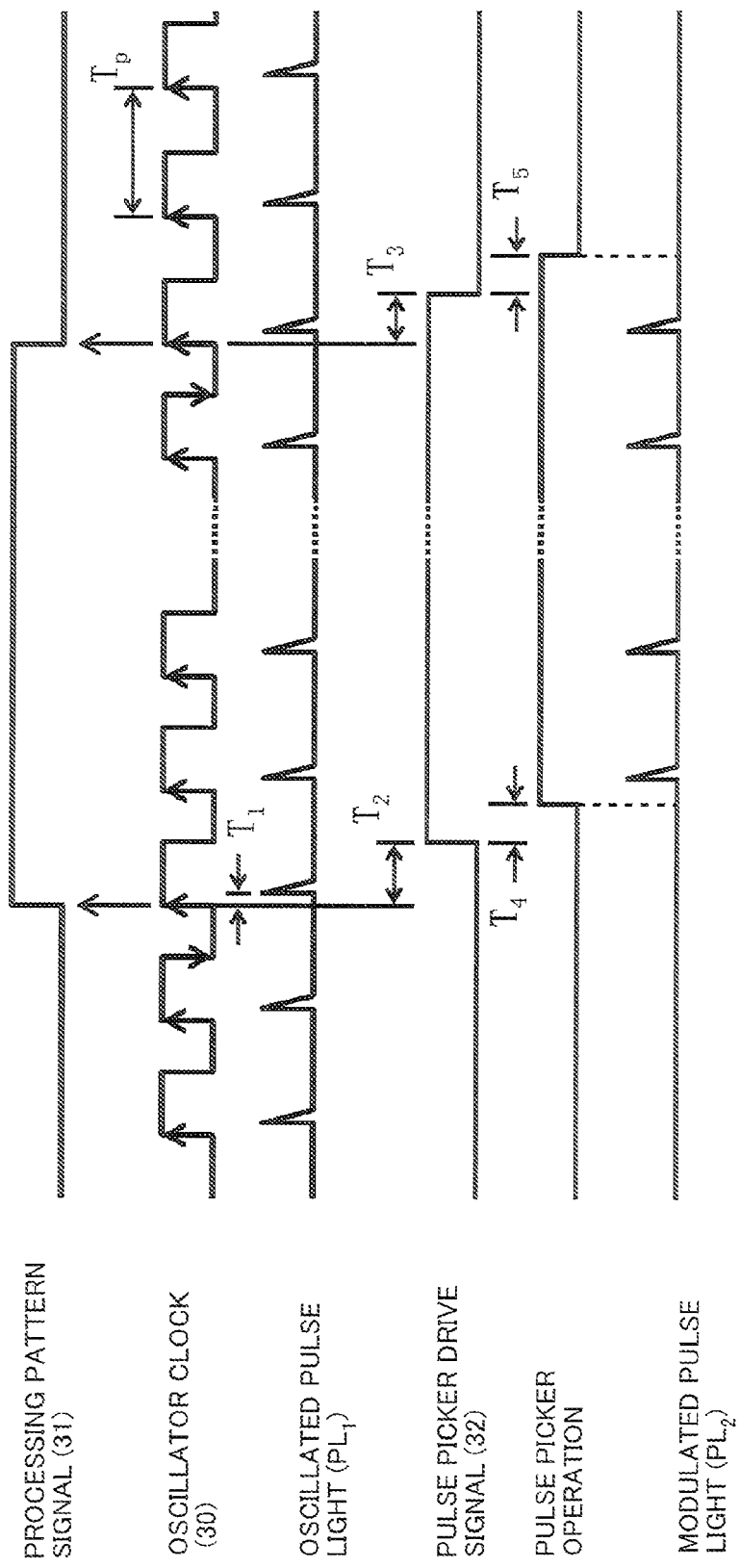
FIG. 6 is a signal waveform diagram for describing a pulse picker operation in the pulse laser processing device according to the embodiment of the present invention.

The processing pattern signal 31 illustrated in FIG. 6 is given from the three-dimensional bit map including distance data from the processing original point. Hence, when the processing original point position matches per scan, the processing start position of the processing pattern scan 31 matches and the pulse picker drive signal 32 is generated at a desired timing.

When the beam scanning device 14 has a galvanometer scanner described in FIG. 3, the scanner clock signal drives a servo control motor as a drive signal from the scanner controlling unit 23. However, the beam scanning device 14 individually operates, thereby producing a phase offset. Hence, using a synchronization angle detection signal which is a scan position signal produced every time the above scan operation is repeated, pass/block of oscillated pulse light and a scan operation of a beam are synchronized, that is, timings are adjusted, so that it is possible to perform laser processing significantly stably.

More specifically, for example, the correcting mechanism controls pass and block of a pulse laser beam in a pulse picker based on a scan position signal. That is, based on the phase difference detected from the scan position signal for synchronization position (angle) detection of the rotation position of the above scan mirror, the timing of a drive signal of a pulse picker in the beam shielding device 12 is specified. By this means, the processing original point position per scan of the pulse laser beam is corrected.

Instead, for example, the correcting mechanism corrects the processing original point position every time a pulse laser beam is scanned, by giving a distance correction value obtained from the phase difference detected from the scan position signal to a scan command signal subsequent to a scan command signal for the laser scanner, in response to the scan angle θo of the scan start position.

The pulse frequency of oscillated pulse light is modulated by the pulse picker operation to generate predetermined modulated pulse light. This will be described with reference to FIG. 6.

As illustrated in FIG. 6, oscillated pulse light delayed by t1 from the oscillator clock 30 of the frequency Tp is blocked or passed according to the pulse picker drive signal 32. For example, the pulse picker drive signal 32 becomes a pattern signal which samples the processing pattern signal 31 according to a rise of the oscillator clock 30, and which is delayed by t2 and rises from a rise of one clock of the oscillator clock 30, and is delayed by t3 and falls from a rise of another clock after a predetermined number of clocks.

Then, the pulse picker operation of the beam shielding device 12 is launched according to the delay times t4 and t5 in response to this pulse picker drive signal, and oscillated pulse light during this operation is extracted as modulated pulse light. Here, the above delay times t2, t3, t4 and t5 are set according to the beam shielding device 12.

In addition, when the beam shielding device 12 uses the acousto-optic modulator (AOM) as described in FIG. 2, a reverse pattern signal of the above pulse picker drive signal 32 becomes a driver signal for controlling on/off of oscillation in the ultrasonic wave generation controlling unit 20. Then, predetermined oscillated pulse light is extracted according to the driver signal of this reverse pattern.

Further, the scan position signal from the above beam scan device 14, for example, the scan position signal of the processing end position in the rotation position of the scan mirror commands the moving timing of the X-Y stage moving device 15. Assuming the one-dimensional scan direction of the beam scanning device 14 as the X axis direction, a predetermined width of stepwise movement or continuous movement is made in the Y axis direction at the above moving timing. Instead, the X-Y stage is continuously moved or stepwisely moved a predetermined distance in the X axis direction. Thus, movement of the X-Y stage is controlled according to the moving pattern determined in advance.

Figure 7:
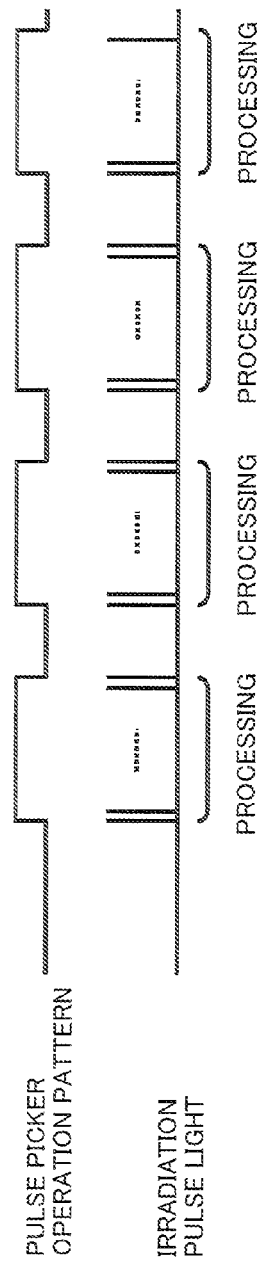
FIG. 7 is an explanatory diagram illustrating an example of projection of irradiation pulse light of the pulse laser processing device according to the embodiment of the present invention.

For example, each modulated pulse light generated according to the pulse picker operation pattern as illustrated in FIG. 7 is shaped in a predetermined shape in the beam shaping device 13. Then, when the above beam scanning device 14 scans the workpiece W position in the X axis direction and the X-Y stage moving device 15 moves the workpiece W position in the Y axis direction, a predetermined position of the workpiece W is irradiated with irradiation pulse light and the surface of the workpiece W is precisely microfabricated. The time width of each pulse picker operation and time interval of each operation in the pulse picker operation pattern in FIG. 7 may be respectively different.

Next, a pulse laser processing method using the pulse laser processing device 10 will be described. According to this pulse laser processing method, for example, a target processing material is placed on a stage, a clock signal is generated, a pulse laser beam synchronized with the clock signal is emitted, the pulse laser beam switched between pass and block is in synchronization with the clock signal and is scanned on the surface of a target processing material in a one-dimensional direction, the pulse laser beam is scanned in the one-dimensional direction, then the stage is moved in a direction orthogonal to the one-dimensional direction and the pulse laser beam is scanned in the one-dimensional direction by switching the pulse laser beam between pass and block in synchronization with the clock signal.

Figure 8:
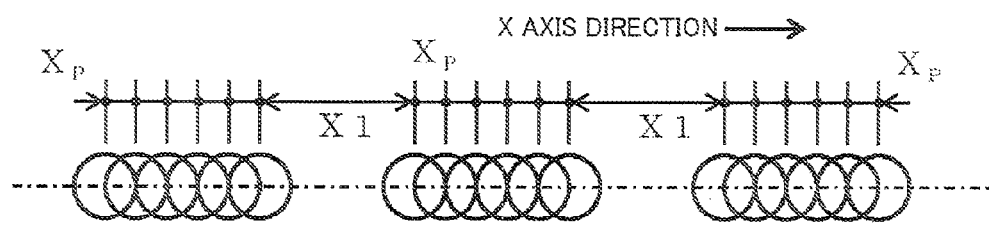
FIG. 8 is an explanatory diagram illustrating an example of an irradiation spot on which irradiation pulse light is projected by the pulse laser processing device according to the embodiment of the present invention.

A specific example of the pulse laser processing method will be described with reference to FIGS. 8 and 9. FIG. 8 schematically illustrates irradiation spots where the time width and time interval of each operation of the pulse picker operation pattern illustrated in FIG. 7 are made uniform, irradiation pulse light is projected on the workpiece W and half of the spot diameter of irradiation pulse light is scanned in the X axis direction by the beam scanning device 14.

Here, six irradiation spots are formed and the scan distance in the X axis direction is Xp. Then, when the beam scanning device 14 performs scan in the X axis direction, similar irradiation spots are repeatedly formed from the separated position of X1 on the workpiece W. A required number of irradiation spots is determined automatically. In addition, although spot light is illustrated in FIG. 8 as a true circle, this spot light changes to another shape such as oval according to the beam cross-sectional shape. Further, these spot diameters are, for example, between about 10 μm and 60 μm.

Further, when passing the start point and the end point which are the scan range (scan field) where the beam scanning device 14 (not illustrated) can be used, the X-Y stage moves a predetermined distance in the X axis direction as described above if necessary. Further, an irradiation spot is similarly formed in an adjacent field. Meanwhile, intervals between adjacent scan fields may be zero and continuous.

Figure 9:
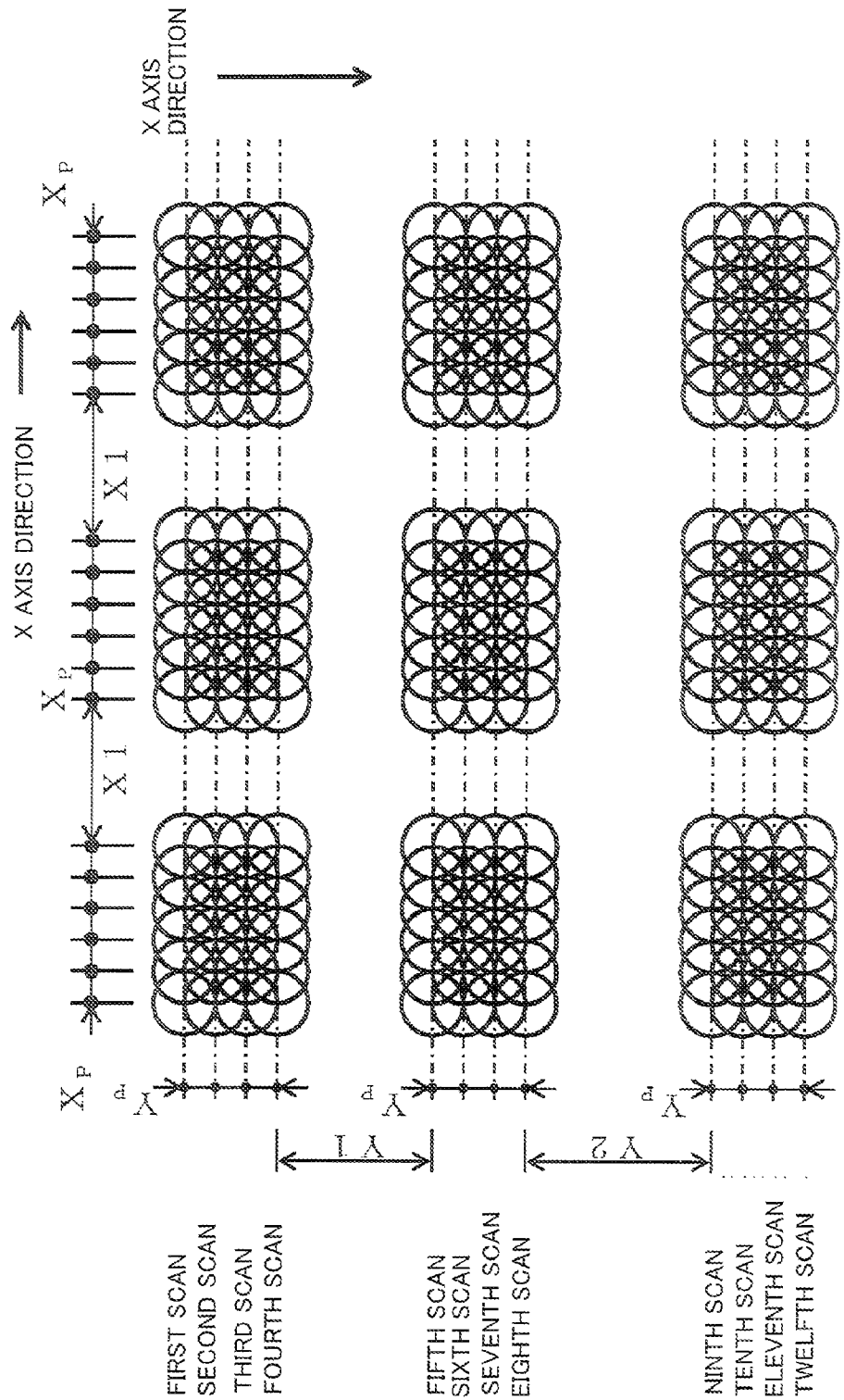
FIG. 9 is an explanatory diagram illustrating another example of an irradiation spot on which irradiation pulse light is projected by the pulse laser processing device according to the embodiment of the present invention.

Next, as illustrated in FIG. 9, when the first scan is finished which projects irradiation pulse light in the above X axis direction described in FIG. 8, the X-Y stage stepwisely moves, for example, a distance corresponding to half of the spot optical diameter in the Y axis direction, from the start position of the irradiation spot in the X axis direction illustrated in FIG. 8. Then, by repeating the same scanning as described in FIG. 8, respective irradiation spots are formed by performing second, third and fourth scans. Thus, four irradiation spots in the Y axis direction are formed, and the distance is Yp. A required number of irradiation spots is determined automatically.

In addition, when the above first scan to fourth scan can be performed in the range between the start point and end point of the rotation position of the scan mirror in the beam scanning device 14, raster scan is effectively used in one direction or bi-directionally.

Further, in a state where a pulse picker operation is not performed, the X-Y stage which holds the workpiece W is moved a moving distance Y1 in the Y axis direction. Similarly, from the moving position of this moving distance Y1, the fifth scan to eight scan are performed to form irradiation spots. Further, by moving the X-Y stage a moving distance Y2 in the Y axis direction, the ninth scan to twelfth scan are performed similarly from the moving position of the moving distance Y2 to form irradiation spots.

When irradiation pulse light is projected as described above, half of the diameters of irradiation spots overlap in the X direction and Y direction. By performing scan in the X axis direction by a laser scanner and adjusting stepwise movement of the X-Y stage in the Y axis direction, it is possible to change the degree of overlapping. In this case, the degree of overlapping is set taking a light intensity distribution of the beam cross section of irradiation pulse light into account.

When the above irradiation pulse light is projected, ablation processing is applied to the surface of the workpiece. W on an irradiation spot of each irradiation pulse light. Further, by repeating projecting irradiation pulse light a predetermined number of times in the first to twelfth scan illustrated in FIG. 9, it is possible to perform pocket processing of the surface of the workpiece W made of a metal plate.

Figure 10:
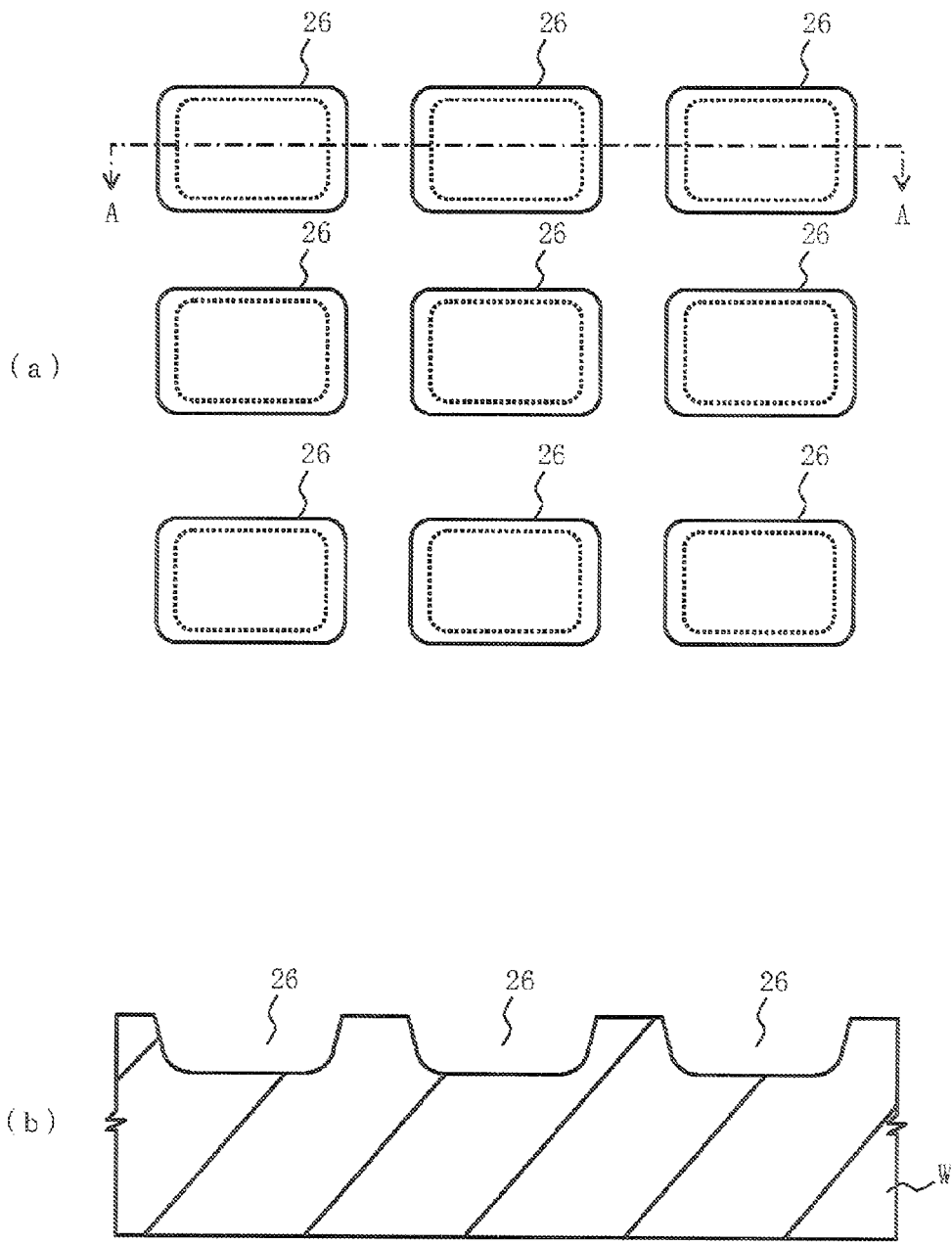
FIG. 10 is a schematic diagram illustrating an example of pocket processing by the pulse laser processing device according to the embodiment of the present invention.

FIG. 10 schematically illustrates an example of pocket processing, and FIG. 10(a) is a plan view of pocket processing and FIG. 10(b) is a sectional view from a A-A arrow view. As shown in FIG. 10, a plurality of concave parts 26 which correspond to projection areas of irradiation pulse light described in FIG. 9 are formed. Here, the dimensions of these concave parts are determined based on an irradiation spot diameter and light intensity distribution of a beam cross section in addition to the number of irradiation spots. Further, the predetermined number of times to repeat projection of the above irradiation pulse light is adequately set according to the material of the workpiece W (particularly, optical absorptance and optical reflectivity in particular), processing shape, wavelength of pulse light, pulse width and intensity of pulse light.

Actually, it is confirmed that the above pocket processing can be applied to the surface of the workpiece W made of Cu material, Ni material, DLC material and SKD11. Further, projecting irradiation pulse light as described above processes the surface of the workpiece W in an arbitrary shape by flexibly generating a pulse picker operation pattern and controlling a predetermined number of times to repeat projection of irradiation pulse light.

For example, it is confirmed that, by using the second harmonic of Nd:YAG laser for the pulse laser oscillating device 11, minute V grooves or R grooves having several tens of μm of the depth and opening width may be processed on the surface of the workpiece W of a Cu plate. Further, processing of a mold for microlenses having several tens of μm of diameters is confirmed. In addition, microfabrication at the level of 1 μm is easy and processing at the level of sub μm can also be performed by reducing the wavelength of pulse light. Further, additionally, it is possible to process the surface of a target processing material made of a polymer material including resin, semiconductor material or glass material.

Next, a modified example of the above embodiment will be described. A pulse laser processing device will be described in this modified example which further facilitates an increase in the speed of laser processing of the workpiece W. For example, the pulse laser processing device may adopt a structure which has a plurality of pulse laser beam generation sources and beam optical systems formed with the pulse laser oscillating device 11, beam shielding device 12, beam shaping device 13 and beam scanning device 14 illustrated in FIG. 1, and which controls and projects irradiation pulse light from a plurality of pulse laser beam generation sources and beam optical systems on the surface of one workpiece W held on the X-Y stage moving device 15. With this laser processing device, the processing controlling unit 16 collectively controls all pulse laser beam generation sources and beam optical systems as described for the pulse laser processing device 10.

Instead, the pulse laser processing device may adopt a structure which branches the pulse laser beam $PL_4$ from the beam scanning device 14, into a plurality of optical paths by means of a plurality of optical splitters, and which projects irradiation pulse light on different areas on the surface of one workpiece W. This processing device needs to increase the light intensity of oscillated pulse light to be emitted from the pulse laser oscillating device 11, according to the above number of optical paths to be branched.

Instead, the pulse laser processing device may adopt a structure in which a diffractive optical element (DOE) is interposed in the optical path between the beam scanning device 14 and X-Y stage moving device 15. In this case, the above diffractive optical element (DOE) can be controlled according to an electrical signal, and the pulse laser beam $PL_4$ can be projected on different areas on the surface of the workpiece W.

Instead, the pulse laser processing device may adopt a structure in which each controlling unit described as the above pulse laser oscillating device 11, beam shielding device 12, beam scanning device 14, and X-Y stage moving device 15 is integrated in the processing controlling unit 16.

Instead, the pulse laser processing device may adopt a structure which uses a mechanism of blocking a beam only while the X-Y stage moves, in place of the pulse picker like the beam shielding device 12.

The pulse laser processing device according to the present embodiment projects irradiation pulse light on the workpiece w to process the two-dimensional surface of a target processing material by scan in the X axis direction by means of a one dimensionally scanning laser scanner and moving the X-Y stage in the Y axis direction. Further, irradiation pulse light projected on the surface of a target processing material is flexibly controlled according to a pulse picker operation pattern.

Further, according to pulse laser processing, in synchronization with a single clock signal generated in a reference clock oscillating circuit, emission of a pulse laser beam, scan of the pulse laser beam and pass and block of the pulse laser beam are controlled. Consequently, positioning precision for irradiation spots projected on the surface of a target processing material is significantly improved.

Further, for example, a correcting mechanism is provided which corrects the processing original point position per scan based on a scan position signal from the laser scanner, so that it is possible to improve positioning precision for irradiation spots.

Further, movement of the stage on which a workpiece is placed is controlled in a direction orthogonal to the one-dimensional direction based on a scan position signal of a laser scanner, so that it is easy to increase the speed of the operation and stabilize the operation.

Further, ablation using ultrashort pulse laser such as a ps laser beam and fs laser beam becomes easy, so that it is possible to suppress thermal deformation of a target processing material as little as possible. Consequently, it is possible to reduce a thermal influence due to pulse laser irradiation on a processing material upon processing. Consequently, it is easy to stably process a minute shape.

Thus, a pulse laser processing device and a pulse laser processing method are realized which, in processing using pulse laser beams, improve positioning precision for irradiation spots and can perform stable microfabrication of the surface of a large target processing material and increase the speed of microfabrication.

Although an exemplary embodiment of the present invention has been described above, the above embodiment by no means limits the present invention. One of ordinary skill in the art can variously modify and change specific embodiments of the present invention without deviating from a technical idea and technical range.

Further, with control based on a scan position signal from the beam scanning device 14, the signal may be detected from a rotation position different from a rotation position of the above one axis scan mirror. Instead, a signal from a rotation driving mechanism other than the above rotation position may be used.

Further, the X-Y stage moving device 15 may adopt a structure which holds a roll in the rotation axis in place of the X-Y stage.

Further, for the pulse laser oscillating device 11, a unit can be used which, in addition to YAG laser, emits single wavelength band laser or multi-wavelength band laser adequately selected depending on a target processing material.

REFERENCE SIGNS LIST

10 PULSE LASER PROCESSING DEVICE
11 PULSE LASER OSCILLATING DEVICE
12 BEAM SHIELDING DEVICE
12a PULSE PICKER CONTROLLING DEVICE
13 BEAM SHAPING DEVICE
14 BEAM SCANNING DEVICE
X-Y STAGE MOVING DEVICE
16 PROCESSING CONTROLLING UNIT
17 ULTRASONIC WAVE OSCILLATING UNIT
18 SOUND WAVE ABSORBING UNIT
19 ULTRASONIC WAVE
20 ULTRASONIC WAVE GENERATION CONTROLLING UNIT
21 ONE AXIS SCAN MIRROR
22 GALVANOMETER
23 SCANNER CONTROLLING UNIT
24 SCAN ANGLE SENSOR
25 fθ LENS
26 CONCAVE PART
$PL_1$, $PL_2$, $PL_3$, $PL_4$ PULSE LASER BEAM

The invention claimed is:

1. A pulse laser processing device comprising:
a reference clock oscillating circuit which generates a clock signal;
a laser oscillator which emits a pulse laser beam synchronized with the clock signal;
a laser scanner which scans the pulse laser beam only in a one-dimensional direction in synchronization with the clock signal and produces a scan position signal related to a position of the scanning;
a stage on which a target processing material can be placed and which moves in a direction orthogonal to the one-dimensional direction, a movement of the stage being controlled in a direction orthogonal to the one-dimensional direction based on the scan position signal from the laser scanner; and
a pulse picker which is provided on an optical path between the laser oscillator and the laser scanner and which switches between passing and blocking the pulse laser beam in synchronization with the clock signal.

2. The pulse laser processing device according to claim 1, further comprising a beam shaping device which shapes the pulse laser beam, on an optical path between the laser oscillator and the laser scanner.

3. The pulse laser processing device according to claim 1, wherein the laser scanner comprises a galvanometer scanner, and the pulse picker comprises an acousto-optic modulator (AOM) or an electro-optic modulator (EOM).

4. The pulse laser processing device according to claim 1, further comprising a correcting mechanism which corrects a processing original point position for each scan, based on a scan position signal from the laser scanner.

5. The pulse laser processing device according to claim 4, wherein the correcting mechanism controls pass and block of the pulse laser beam in the pulse picker based on the scan position signal.

6. A pulse laser processing method comprising:
placing a target processing material on a stage;
generating a clock signal;
emitting a pulse laser beam synchronized with the clock signal;
scanning the pulse laser beam on a surface of the target processing material in a one-dimensional direction using a laser scanner in synchronization with the clock signal, by switching between passing and blocking the pulse laser beam by a pulse picker in synchronization with the clock signal;
producing a scan position signal based on a position of the scanning;
moving the stage in a direction orthogonal to the one-dimensional direction based on a scan position signal from the laser scanner after scanning the pulse laser beam in the one-dimensional direction; and
scanning the pulse laser beam in the one-dimensional direction by switching between passing and blocking in synchronization with the clock signal.

* * * * *